No. 814,262. PATENTED MAR. 6, 1906.
W. L. BODMAN.
TEA OR COFFEE POT.
APPLICATION FILED MAR. 22, 1905.
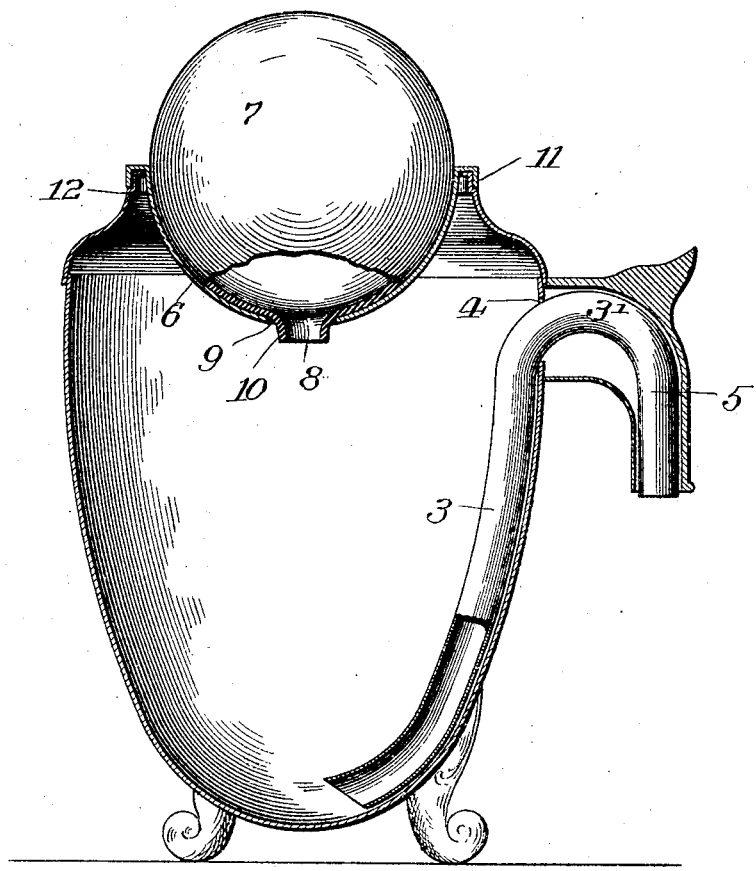
Witnesses:
Harold G. Barrett
M. A. Kiddie
Inventor:
Walter L. Bodman
by Wm. J. Belknap Atty.

UNITED STATES PATENT OFFICE.

WALTER L. BODMAN, OF MAYWOOD, ILLINOIS.

TEA OR COFFEE POT.

No. 814,262.  Specification of Letters Patent.  Patented March 6, 1906.

Application filed March 22, 1905. Serial No. 251,405.

*To all whom it may concern:*

Be it known that I, WALTER L. BODMAN, a subject of the King of Great Britain, residing at Maywood, in the county of Cook and State of Illinois, have invented new and useful Improvements in Tea or Coffee Pots, of which the following is a specification.

This invention relates to improvements in tea or coffee pots; and its object is to provide simple means for discharging the contents of the pot without tilting it.

In the accompanying drawing I have illustrated one form in which the invention can be embodied, the figure being partly in section.

The invention consists, essentially, in utilizing a compressible bulb for producing a pressure of air in the teapot to force the liquid therefrom.

In carrying my invention into effect I provide a pot 2 of any suitable form having a discharge-tube 3 located within the pot and extending down to the bottom thereof and passing through an opening 4 in the side of the pot and terminating in the discharge-spout 5. The lid 6 is concave or cup-shaped in form and made to correspond generally to the lower part of the rubber bulb 7, which rests therein and is provided with an opening 8 to register with a corresponding opening 9 in the lid. I prefer to provide a flange 10 around this opening 8 in the bulb to enter the opening 9 in the lid, and thus form a guide by means of which the bulb can be properly positioned in the lid and maintained in this position to produce a constant registration of the opening in the bulb with the opening in the lid. The lid may be made substantially hemispherical in form to accommodate the spherical bulb, as illustrated in the drawing; but of course these parts can be made in other forms, corresponding to each other, and produce equivalent results. The lid is made removable from the pot and is provided with a peripheral flange 11, which fits over the edge 12 of the pot, forming the opening in which the lid and bulb rest.

In practice the bulb is simply compressed to produce a sufficient pressure of air in the pot to discharge the liquid from the spout. The level of the liquid will always be the same in the pot and in the discharge-tube before the bulb is compressed, and the pressure produced in the pot by the compression of the bulb is distributed over a wide area, and comparatively little pressure is required to force the column of liquid from this level in the tube over the bend 3' of the tube.

The invention is very simple in construction and can be manufactured at very low cost. The teapot as constructed in the manner illustrated in the drawing comprises only the three parts—the pot itself, to which the discharge-tube is rigidly fastened in any suitable manner, the removable lid, and the bulb, and the bulb is removable from the lid. The guide formed around the opening in the bulb enables the proper arrangemant of the bulb in the lid with the openings in registration and, furthermore, acts to maintain the bulb in this position. The pressure applied to compress the bulb results in making an air-tight connection between the bulb and the lid during the time of deflection to maintain the pressure in the pot, and it is not absolutely necessary that the bulb and lid should conform to each other in shape, because the pressure of the bulb will produce a sufficient conformity to make a tight joint.

Without limiting myself to the exact construction and arrangement of parts herein shown and described, what I claim, and desire to secure by Letters Patent, is—

A tea or coffee pot comprising a pot having an opening therein, a cup-shaped lid for said opening and provided with an opening in its bottom, and a rubber bulb adapted to be held in the hollow of said lid and provided with an opening to register with the opening in the lid.

WALTER L. BODMAN.

Witnesses:
 WM. O. BELT,
 M. A. KIDDIE.